United States Patent [19]

Fuzioka et al.

[11] 4,336,833
[45] Jun. 29, 1982

[54] TUBELESS PNEUMATIC TIRES

[75] Inventors: Keizi Fuzioka, Kishiwada; Masami Shinomiya, Izumi-Ohtsu, both of Japan

[73] Assignee: The Ohtsu Tire & Rubber Co., Ltd., Osaka, Japan

[21] Appl. No.: 197,068

[22] Filed: Oct. 15, 1980

[30] Foreign Application Priority Data

Oct. 29, 1979 [JP] Japan .................. 54-135462

[51] Int. Cl.³ .................. B60C 9/04; B60C 9/20; B60C 13/00
[52] U.S. Cl. .................. 152/353 G; 152/330 R; 152/353 R; 152/357 A; 152/356 R; 152/361 R
[58] Field of Search ............ 152/330 R, 352 R, 352 A, 152/353 R, 353 C, 353 G, 354 R, 354 RB, 355, 356 R, 357 A, 361 R, 361 FP, 361 DM, 197–202; 156/128 P, 125

[56] References Cited

U.S. PATENT DOCUMENTS

| | | | |
|---|---|---|---|
| 3,192,984 | 7/1965 | Bourdon | 152/354 |
| 3,208,500 | 9/1965 | Knipp et al. | 152/357 A |
| 3,631,913 | 1/1972 | Boileau | 152/354 R |
| 3,712,362 | 1/1973 | Alderfer | 152/361 R |
| 3,782,440 | 1/1974 | Depmeyer | 152/354 |
| 3,948,304 | 4/1976 | Mirtain | 152/354 |
| 4,253,512 | 3/1981 | Yoshiora et al. | 152/357 A |

OTHER PUBLICATIONS

Research Disclosure, "Reinforcing Annular Structure for Tyres", No. 12302, Jul. 1974.

Primary Examiner—Edward C. Kimlin
Assistant Examiner—Lois E. Boland
Attorney, Agent, or Firm—Armstrong, Nikaido, Marmelstein & Kubovcik

[57] ABSTRACT

A tubeless pneumatic tire comprising a body made entirely of an elastic material and cords embedded in the body and having a length not extending from bead to bead. The opposite ends of the cords are disposed in a pair of annular projections formed on the inner surface of the tire and centered about the axis of rotation of the tire. An elastic deformable portion is provided between each of the beads and the corresponding ends of the cords.

8 Claims, 17 Drawing Figures (1)

(2)

TUBELESS PNEUMATIC TIRES

BACKGROUND OF THE INVENTION

Pneumatic tires for vehicles adapted to be driven in various areas including desert, wet land, waste land, etc. advantageously have high flexibility, a large ground contact area so as to have sufficient load-carrying capacity and traction for running in such areas and an inflation pressure of about 0.1 to 0.3 kg/cm$^2$ in order to run at a low ground contact pressure. Accordingly cordless tires made only of rubber or equivalently elastic material and capable of retaining a low pressure are preferable as tubeless pneumatic tires for use in such vehicles.

However, cordless tires are very susceptible to puncture when the tread strikes nails, glass pieces and other sharp obstacles on the road surface. Particularly tubeless pneumatic tires for vehicles to be driven in various areas are more prone to puncture because of varying driving environments.

While pneumatic tires are adapted to mitigate shocks by the deformation of the tread during travel, shock impact, when acting thereon, deforms the tire and also gives the tire an increased inflation pressure, which acts to reduce the deformation and the absorption of the impact.

The reduction in the volume of the deformed portion of the tire due to the deformation is balanced by bulging deformation of another portion of the sealed interior of the tire, or by an increase in the inflation pressure.

As means for rendering tires less susceptible to puncture, tire cords are incorporated in tubeless pneumatic tires which are made entirely of rubber or equivalently elastic material.

With such tubeless pneumatic tires having cords incorporated therein, the cords extend from one bead of the tire to the other bead, with the opposite ends of the cords substantially secured to the beads. The inflation pressure of the tire acts on the cords and is ultimately supported by the beads.

When the tire cords have a low elongation and extend from bead to bead as fixed thereto, the variation in the interior volume of the tire due to deformation is balanced to a greater extent by the increase of the inflation pressure of the tire than by the bulging deformation of the interior of the tire which is restrained by the cords. This greatly reduces the absorption of impact. Although outstanding in endurance against puncture, the tire does not have flexibility sufficient for use in vehicles for travelling in various areas, rendering such vehicles seriously uncomfortable to ride.

SUMMARY OF THE INVENTION

The present invention relates to tubeless pneumatic tires, and more particularly to tubeless pneumatic tires capable of retaining a low inflation pressure, having resistance to puncture and the desired flexibility and suited for use in vehicles adapted to be driven in various areas.

The invention provides a tubeless pneumatic tire having a body made entirely of an elastic material and bead portions, the tire being characterized by cords embedded in the body and having a length not extending from bead portion to bead portion, annular projections positioned approximately symmetrically with respect to the equatorial line of the tire in the vicinity of the shoulders of the tire and earth formed on the inner surface of the tire along a circumference centered about the axis of rotation of the tire, each of the annular projections having disposed therein the corresponding ends of the cords, and an elastic deformable portion provided between each of the bead portions and the corresponding ends of the cords.

An object of this invention is to provide a tubeless pneumatic tire having a body made entirely of rubber or like elastic material and cords embedded in the body and having opposite ends not secured to the tire beads, with an elastic deformable portion provided between each of the beads and the corresponding ends of the cords, the tire thus being made capable of depressing the rise of its inflation pressure to absorb shocks and afford satisfactory cushioning although having reliable resistance to puncture.

Another object of the invention is to provide a tubeless pneumatic tire of the construction described above in which the ends of the cords on each side of the tire are curved and further extend toward the interior of the tire to diminish the difference in elongation between the tire cords involving a small elongation and the elastic deformable portion having a great elongation for the distribution of the force acting on the tire and to thereby prevent separation between the cord ends and the elastic deformable portion.

Another object of the invention is to provide a tubeless pneumatic tire of the foregoing construction in which the opposite ends of the cords are disposed in annular projections formed on the inner surface of the tire and each having an annular protrusion for holding the corresponding cord ends out of contact with the tire inner surface, the protrusion thus preventing the cord ends from wearing and developing a rupture.

Still another object of the invention is to provide a tubeless pneumatic tire of the type described and having a simple construction in which the elastic deformable portions are smoothly deformable during driving, especially during cornering, whereas the tire cords give the tire proper rigidity to withstand the driving operation to assure improved steering and cornering performance.

DESCRIPTION OF THE PREFERRED EMBODIMENTS

With reference to FIGS. 1 to 4, a tubeless pneumatic tire of this invention comprises a pair of bead portions 2, sidewalls 3, shoulders 4 and a tread 5. These portions are made from rubber or an equivalently elastic material, such as natural rubber, synthetic rubber, polyurethane or the like, in the form of a body.

Figure 1:
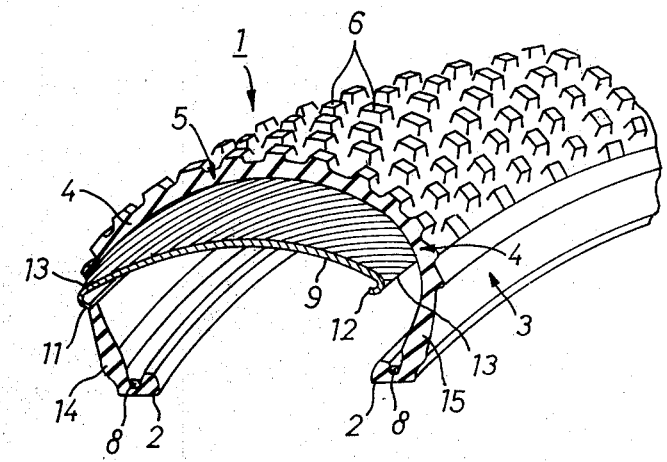
FIG. 1 is a perspective view partly broken away and showing a tubeless pneumatic tire according to the invention.

The tread 5 is formed on its outer peripheral surface with projections 6 which, as seen in FIG. 1 for illustrative purposes, are in the form of blocks projecting integrally from the base of the tread 5 and spaced at a predetermined distance along the equatorial line of the tire and also transversely of the line.

These projections may be annular ribs extending along the equatorial line of the tire, or lateral oblique or parallel lugs spaced along the line, or those formed by zigzag grooves.

Figure 4:
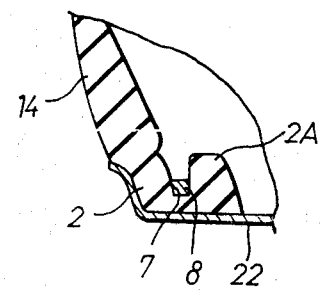
FIG. 4 is an enlarged sectional view showing a bead portion of the tire.
Figure 5:
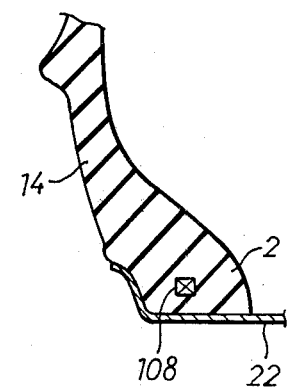
FIG. 5 is a sectional view showing a modified bead portion.

The sidewall 3 has a progressively increasing thickness toward the bead portion 2. As seen in FIG. 4, the bead portion 2 has a circumferential groove 7 with a support ring 8 fitted therein. The ring 8 in the illustrated embodiment comprises a piano wire or like steel wire. The ring 8 may be made of metal, plastics or fiber which is substantially not stretchable. Alternatively the ring may be embedded in the bead portion 2 as indicated at 108 in FIG. 5.

Tire cords 9 are provided in the tire body circumferentially thereof as a structure for preventing puncture and giving rigidity to the tire. Examples of useful materials for the cord 9 are those having a small elongation, including synthetic fibers such as nylon, polyester and like fibers, artificial fibers such as rayon fibers, and natural fibers. These materials are used in the form of a cord, filament, tape or the like. Also useful are steel, aluminum, other metals, alloys and composite materials of such metals. Such materials are usable also in the form of loosely arranged yarns or strips or a thick fabric, insofar as the cord element has almost no elongation.

The tire cords 9 made of such material have a length not extending from bead portion to bead portion and are embedded in the tire body as positioned along and closer to the inner peripheral surface 10 of the tire.

Although the cords 9 are arranged in the form of a single layer in the illustrated embodiment, such cords may be arranged in two or more layers. When a plurality of cord layers are used, the layers may be superposed with their ends displaced from one another axially of the tire in a stepwise fashion. The tire cords 9 may be embedded in and near the center of the gauge thickness of the tread 5. This can be done with the use of an unillustrated core mold having applied thereto an elastic material similar to or compatible with the material of the tire body before mold clamping. However, when the cords are embedded in the tread 5 as disposed along and closer to the inner periphery of the tire as illustrated, a uniform gauge thickness can be given to the tread 5, hence advantageous.

When the cords 9 are embedded in the body, that is in the tread 5, the weft cords are arranged at an angle $\theta$ of 0 to 15 degrees with respect to the equatorial line 0—0 of the tire. This gives good cushioning ability to the tire. The angle $\theta$ can be as large as 50 degrees, for example, when higher rigidity and greater load-bearing capacity are required of the tire.

Since the tire cord layer 9 has a length not extending from bead portion to bead portion, one end 11 of each cord 9, i.e., of the cord layer, is disposed at a location away from the equatorial line 0—0 of the tire axially thereof, for example, at the shoulder 4 or preferably at a location further away from the shoulder 4 toward the center of the tire. The other end 12 of the cord layer is similarly positioned on the other side of the tire. Thus the opposite ends 11 and 12 of the cord layer 9 are positioned approximately symmetrically with respect to the equatorial line 0—0 in the vicinity of the shoulders 4. Substantially elastically deformable portions 14, 15 are provided between the ends 11, 12 and the bead portions 2, 2.

Figure 2:
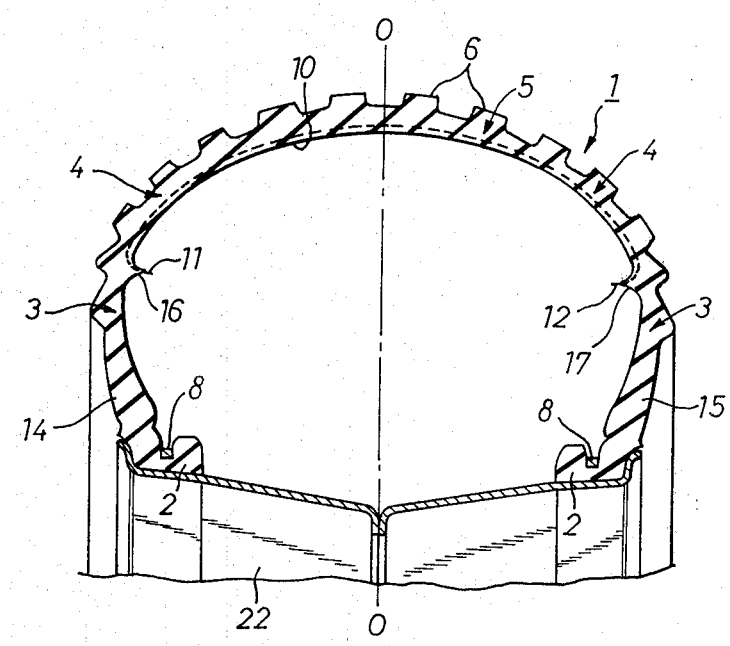
FIG. 2 is a sectional view showing the tire as fitted to a rim.

Since the ends 11, 12 are arranged symmetrically, the pair of elastic deformable portions 14, 15 are also positioned and shaped symmetrically with respect to the equatorial line as seen in FIG. 2.

The ends 11, 12 are disposed in annular projections 16, 17 positioned symmetrically with respect to the equatorial line and each formed on the inner surface of the tire along a circumference centered about the axis of rotation of the tire. As illustrated for the end 11 in FIG. 2, the end is curved as at 13 and further extends toward the interior of the tire and projects substantially from the tire inner surface 10 in the vicinity of the boundary between the shoulder 4 and the sidewall 3.

To assure satisfactory adhesion of the tire cords 9 with the tire body, the cords are used as coated with an uncured or semicured material which is the same as the material of the body or compatible therewith. The cords or cord assembly thus treated is cut (including bias cutting) in a predetermained shape and size before use. Accordingly the cut ends are left untreated and will not be effectively adhered for fabrication. Further to anchor the cord ends effectively, the ends 11, 12 of the cords or cord layer 9 are caused to extend inward from the inner surface 10.

Since the air within the tire is likely to enter the cord layer 9 through the cut ends by capillarity and cause oxidation, the exposed end faces can be formed with a coating for preventing ingress of air.

Figure 3:
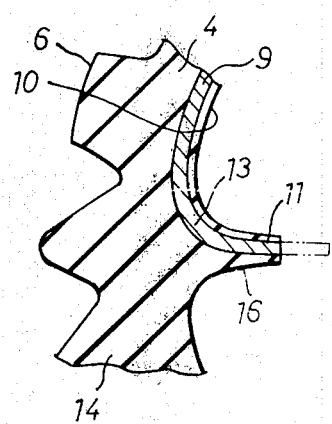
FIG. 3 is an enlarged sectional view showing one end of the cord shown in FIG. 2.

The exposed end shown in a broken line in FIG. 3 is likely to contact the tire inner surface 10 when shaken during driving, so that the end can be cut off, in which case the cut end can be formed with the above-mentioned coating for preventing ingress of air.

The ends 11, 12, even when left on the annular projections 16, 17 uncut, are not objectionable in appearance or performance.

FIGS. 7 to 10 show a tubeless pneumatic tire 101 of the invention having an improved construction. Like the foregoing embodiment, the body of the tire is made entirely of rubber or an equivalently elastic material and has a pair of bead portions 102, sidewalls 103 and shoulders 104 and a tread 105. As is the case with the first embodiment described in detail with reference to FIGS. 2, 3, etc., the tire 101 further has bead portions 102, lugs 106, tire cords 109 provided along the inner periphery 110 of the tire, annular projections 116, 117 formed on the inner surface 110 and having disposed therein the opposite ends 111, 112 of the cords 109 which are curved as at 113, and elastic deformable portions 114, 115 between the cord ends 111, 112 and the bead portions 102, 102.

The embodiment shown in FIGS. 7 to 10 differs from the first embodiment in that the annular projections 116 and 117 further have at their ends protrusions 18 which are disposed and shaped symmetrically with respect to the equatorial line 0—0 of the tire.

Figure 8:
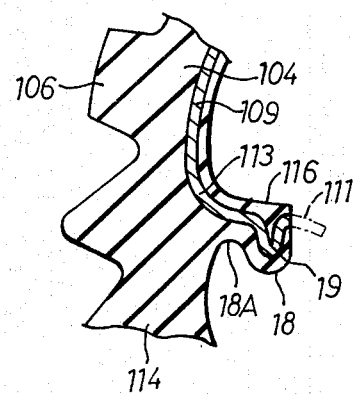
FIGS. 8 to 10 are enlarged sectional views showing three different cord end portions useful for the embodiment of FIG. 7.
Figure 9:
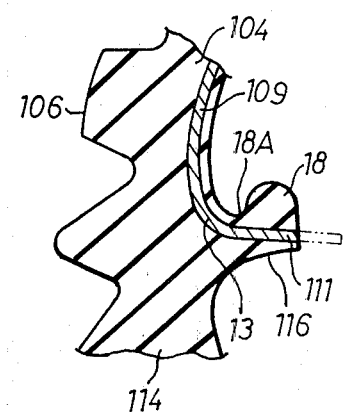
Figure 10:
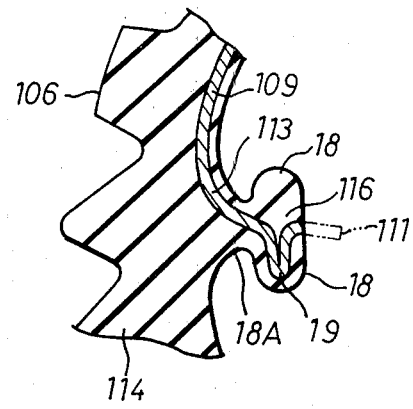

FIGS. 8 to 10, given representatively for the annular projection 116, show three examples of the projection. The protrusion 18 is made integral with the tire body by a constricted portion 18A and serves to prevent a rupture from developing in the end 111 of the cord layer. When the end 111 shown in a broken line is left uncut, the protrusion 18 serves to hold the end out of contact with the tire inner surface.

As seen in FIG. 8, the protrusion 18 may be formed on the inner side of the end, or as shown in FIG. 9, it may be provided on the outer side thereof. The protrusion 18 may be formed on each side of the end as seen in FIG. 10. However, the protrusion 18, when formed on the inner side as shown in FIGS. 8 and 10, is advantageous. When the cord 109 is displaced or stretched longitudinally thereof by the flow of material during the tire molding operation, the stretched portion can be accommodated as a crease 19 in the protrusion which is positioned away from the bent portion 113, namely at a location where such stretch is less likely to affect the performance of the tire. The protrusion also serves to prevent disturbance of the cord ends and development of a rupture in the cord layer.

Figure 7:
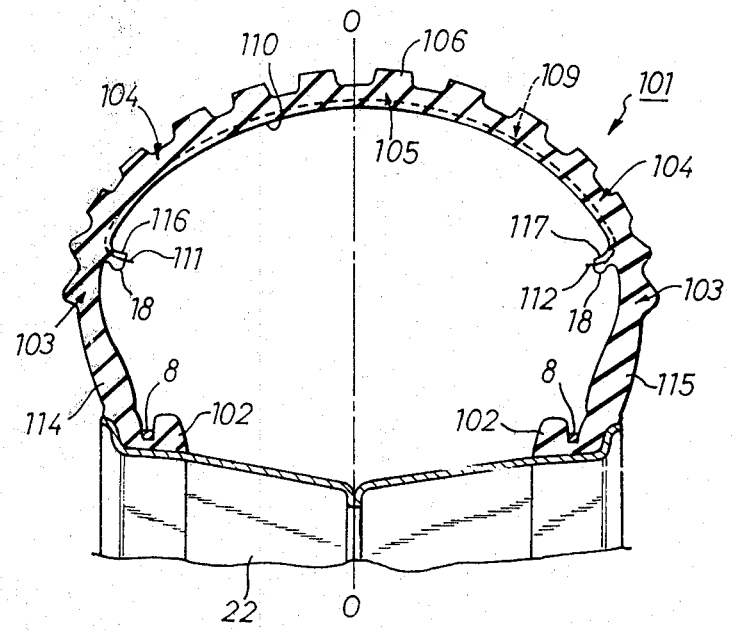
FIG. 7 is a sectional view showing another tubeless pneumatic tire of this invention as fitted to a rim.
Figure 6:
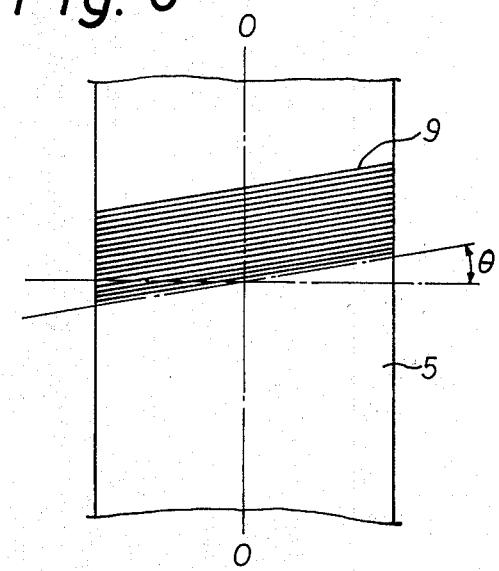
FIG. 6 is a plan view schematically showing an arrangement of cords.

Although the protrusion 18 is provided on each of the annular projections 116, 117 in the embodiment of FIG. 7, the protrusion 18 may be provided on only one of the projections.

Figure 12:
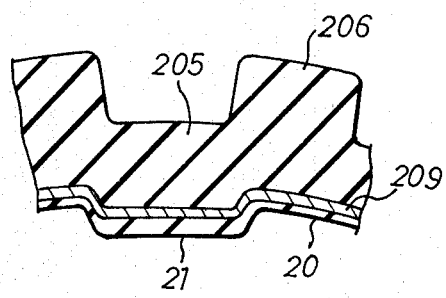
FIG. 12 is a fragmentary sectional view on an enlarged scale of FIG. 11.

In order to prevent the disturbance or displacement of cords during manufacture, the inner surface of the tire can be so modified as shown in FIGS. 11 to 14, which show a third embodiment. The tire 201 has a pair of bead portions 202, sidewalls 203 and shoulders 204, and a tread 205 having lugs 206. The tire body including these portions is made of a substantially elastic material. This embodiment differs from the first in that the tread 205 is formed on its inner surface with indentations 20 and projections 21, and that tire cords 209 having substantially small elongation are enclosed in the projections 21 as seen in FIG. 12. The embodiment is similar to the first with respect to the constructions of annular projections 216, 217, opposite cord ends 211, 212 disposed in the projections 216, 217, and elastic deformable portions 214, 215 between the ends 211, 212 and the bead portions 202.

Figure 11:
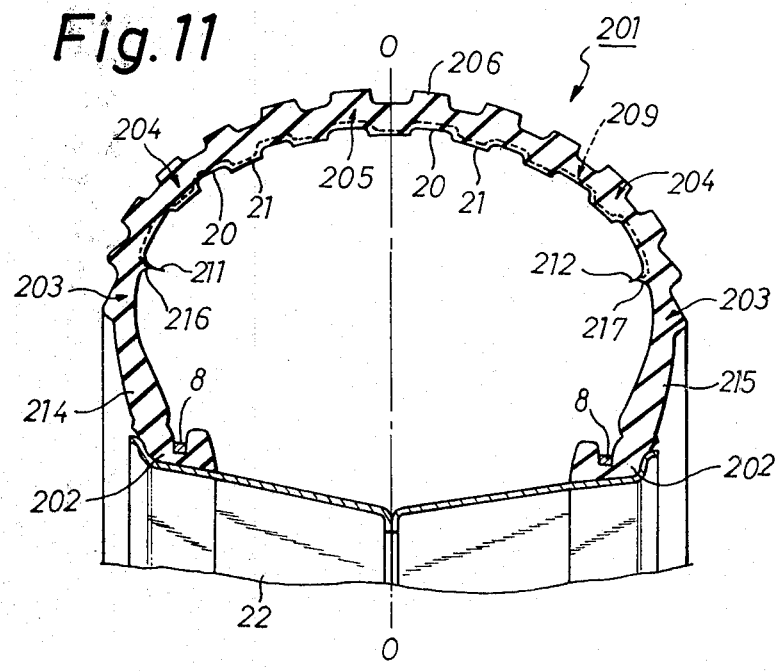
FIG. 11 is a sectional view showing another tubeless pneumatic tire of this invention as fitted to a rim, the tire having a modified inner surface.

With the third embodiment shown in FIG. 11, the tire cord end portions can be of the same construction as shown in one of FIGS. 8 to 10.

Figure 13:
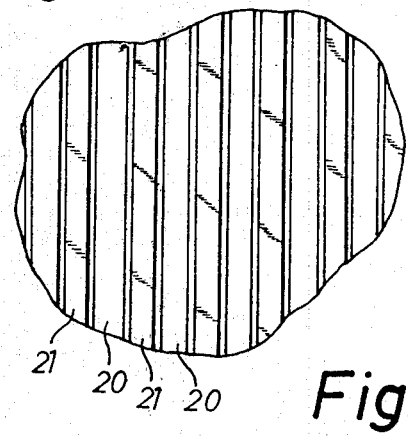
FIGS. 13 and 14 are views showing two exemplary patterns on the inner surface of the tire of FIG. 11.
Figure 14:
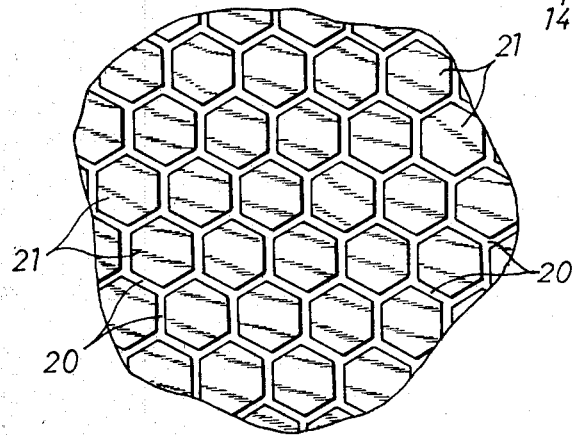

The core mold (not shown) for producing the tire 201 shown in FIG. 11, when formed in its outer periphery with circumferential grooves in the direction of the equatorial line of the tire, the indentations 20 and projections 21 shown in FIG. 13 are formed on the inner surface of the tire. When the unillustrated core mold has in its outer periphery honeycomb grooves, the indentations 20 and projections 21 shown in FIG. 14 are formed on the inner surface of the tire. The pattern of the indentations 20 and projections 21 can be modified although not shown. It is preferable that the pattern be positioned and shaped symmetrically with respect to the equatorial line 0—0 as seen in FIG. 11.

With the tire 201 shown in FIGS. 11 to 14, the cords 209 are placed into the grooves in the core mold (not shown) during molding and are thereby prevented from being displaced or disturbed by the flow of the molding material. Since the cords 209 are flexed in the direction of a section of the tire, the cords afford moderate rigidity and high flexibility to the tire by the cooperation of the cords and the elastic deformable portions 214, 215, thus assuring improved cushioning.

Although rims 22 comprising two divided segments are shown in FIGS. 2, 7 and 11 for the first to third embodiments, drop center rims, etc. are alternatively usable. The rims for holding the tires of this invention are provided with valve means (not shown) serving as means for injecting air.

The tubeless pneumatic tire of this invention is fitted to the rim 22 serving as a holding frame as seen in FIGS. 2, 7 and 11, and air is injected into the tire through the unillustrated means to a low pressure of about 0.1 to 0.3 kg/cm$^2$ to serve as a wheel.

Figure 15:
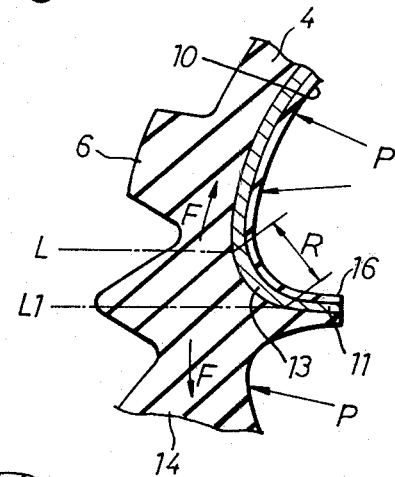
FIG. 15 is a diagram illustrating the force acting the cord end portions of the tire of this invention.

FIG. 15 shows part of the tire 1 of the first embodiment to illustrate the force acting on the tire when it is thus inflated.

With the bead portion of the construction shown in FIG. 4, the air filling the tire elastically deforms the projection portion 2A of the bead to the form of a wedge, with the result that the support ring 8 fitted in the circumferential groove 7 bites into the bead portion to hermetically hold the bead portion to the rim.

At the cord incorporating portion including the tread 5 and the shoulders 4, the cords 9, which are almost nonstretchable, withstand the inflation pressure P shown in FIG. 15. Accordingly there is a great difference in elongation between the cord incorporating portion and the elastic deformable portions 14, 15, especially at the boundary portions therebetween. Consequently a concentrated force will act on the boundary portions, which would suffer excessive fatigue partly because of their movement during driving, possibly developing a rupture.

More specifically stated, the force F exerted on the tire body by the inflation pressure P acts concentrically on a line L. However, since each end (one end 11 only shown in FIG. 15) of the tire cord 9 is curved as at 13 over an area R, extends toward the interior of the tire and is disposed in the annular projection 16, the concentric elongation or stretch is distributed through the portion between the line L and a line $L_1$ and is thereby mitigated. Thus the tire retains durability against concentric load although the elastic deformable portions 14, 15 give flexibility to the tire, while the cord layer 9 imparts resistance to puncture to the ground engaging portion including the tread 5. This feature will be described in detail with reference to FIGS. 16 (1) and (2) showing the tire of the second embodiment during use.

Figure 16:
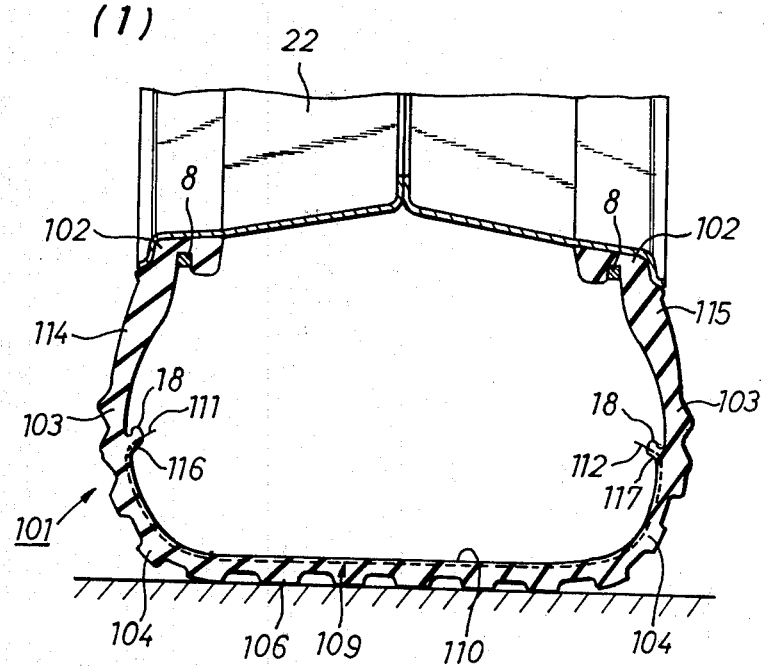
FIGS. 16 (1) and (2) are sectional views showing the tire of this invention during driving along a straight course and during cornering, respectively.
Figure 16:
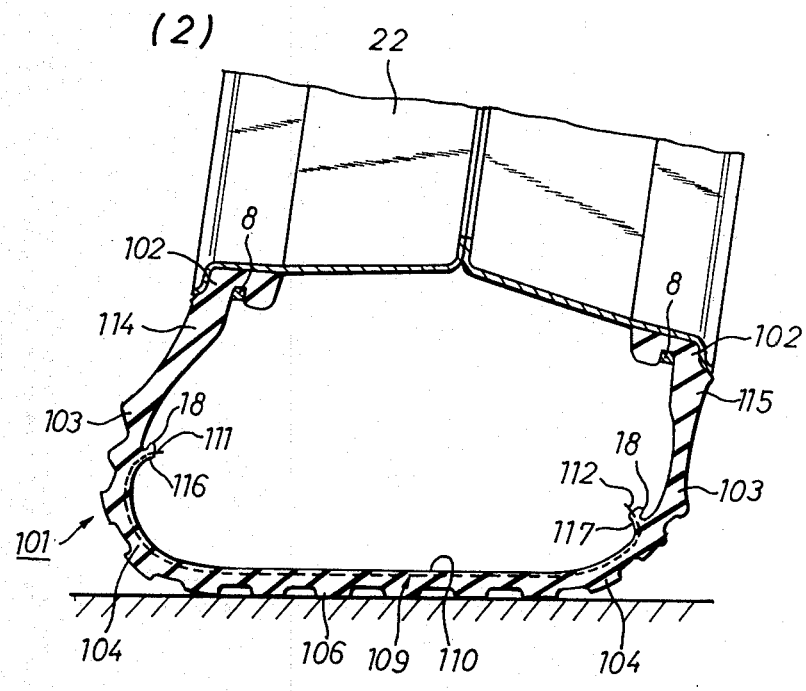

The assembly of the tire and a rim is 8 inches in rim diameter, 22 inches in tire outside diameter and 11.0 inches in tire width, and has an inflation pressure of 0.15 kg/cm$^2$ and weighs 70 kg. FIG. 16 (1) shows the tire while running along a straight course, and FIG. 16 (2) shows the same during cornering.

FIG. 16 (2) shows that the variation in the interior volume of the tire due to its deformation is corrected by the deformation of the elastic deformable portions 114, 115, namely, substantially by the elongation thereof. Thus, as compared with tires in which such volume variation is balanced by an increase in the inflation pressure, the tire involves reduced impact when cornering (also at the moment when the tire strikes an obstacle while running straight) and therefore has improved cushioning ability. Furthermore, the tire is in contact with the ground over an increased area (at the tread) to afford enhanced traction. Although the cord layer 109 gives higher resistance to puncture, the difference in elongation between the ends 111, 112 of the cord layer and the elastic deformable portions 114, 115 is mitigated for the reason already stated with reference to FIG. 15.

With the tubeless penumatic tire of this invention, the cord layer which is not secured to the bead portions is freely movable relative to the beads and prevents puncture, while the elastic deformable portions at the sidewalls of the tire, which are much more stretchable than the ground contact portion, elastically deform to diminish the rise of the inflation pressure for the absorption of shocks, i.e. for improved cushioning.

The opposite ends of the cord layer, which are positioned in the annular projections formed on the inner surface of the tire and centered about the axis of rotation of the tire, serve to reduce the elongation difference involved in these portions. Although having improved durability against puncture, the tire therefore has uniform rigidity as desired and retains sufficient flexibility. Since the cord ends are disposed in the annular projections which are provided with end protrusions, the cord ends can be prevented from developing a rupture.

Briefly the tubeless pneumatic tire of this invention has improved resistance to puncture although having enhanced cushioning properties and is therefore very useful for vehicles which are adapted for driving in various areas.

What is claimed is:

1. A tubeless pneumatic tire having a body made entirely of an elastic material comprising a tread, shoulders, sidewalls, bead portions and boundaries between the shoulders and the sidewalls and comprising cords embedded in the body and having a length not extending from bead portion to bead portion, elastic deformable portions provided between the opposite ends of the cords and the bead portions and made only of said elastic material of the body, and annular projections positioned at the boundaries between the shoulders and the sidewalls of the tire approximately symmetrically with respect to the equatorial line of the tire and each formed on the inner surface of the tire along a circumference centered about the axis of rotation of the tire, the ends of the cords on each side of the tire being curved, further extending toward the interior of the tire and being disposed within the annular projection.

2. A tubeless pneumatic tire as defined in claim 1 wherein the cords embedded in the body are positioned along and closer to the inner peripheral surface of the tire.

3. A tubeless pneumatic tire as defined in any one of claims 1 to 2 wherein the inner peripheral portion of the tire having the cords embedded therein are formed with projections spaced apart in the direction of the axis of the tire, and the cords are enclosed in the projections.

4. A tubeless pneumatic tire as defined in any one of claims 1 to 2 wherein at least one of the annular projections having the cord ends disposed therein has a constricted portion extending into a protrusion.

5. A tubeless pneumatic tire as defined in claim 4 wherein annular projections substantially projecting from the inner surface of the tire are positioned symmetrically with respect to the equatorial line of the tire at the shoulders of the tire and have disposed therein the opposite ends of the cords, each of the annular projections having a constricted portion extending into a protrusion, and the opposite ends of the cords exposed from the annular projections are held out of contact with the inner surface of the tire by the protrusions.

6. A tubeless pneumatic tire as defined in claim 5 wherein the opposite ends of the cords exposed from the annular projections are cut off, and the cut ends are treated to prevent ingress of air.

7. A tubeless pneumatic tire as defined in claim 5 wherein one end of each of the cords are curved and further extend into the protrusion, and the protrusion is made integral with the inner surface of the tire by the constricted portion.

8. A tubeless pneumatic tire as defined in claim 7 wherein the annular projections having the opposite ends of the cords disposed therein and the elastic deformable portions are positioned and shaped symmetrically with respect to the equatorial line of the tire.

* * * * *